(12) United States Patent
Reynar et al.

(10) Patent No.: US 7,739,212 B1
(45) Date of Patent: Jun. 15, 2010

(54) SYSTEM AND METHOD FOR UPDATING FACTS IN A FACT REPOSITORY

(75) Inventors: Jeffrey C. Reynar, Mountain View, CA (US); Andrew T. Miller, Mountain View, CA (US); Daniel J. Yehuda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 455 days.

(21) Appl. No.: 11/692,475

(22) Filed: Mar. 28, 2007

(51) Int. Cl.
*G06F 17/00* (2006.01)
(52) U.S. Cl. .......................................... 706/46; 706/59
(58) Field of Classification Search .................. 706/59, 706/46
See application file for complete search history.

(56) References Cited

U.S. PATENT DOCUMENTS

| 5,475,819 | A | 12/1995 | Miller et al. | |
|---|---|---|---|---|
| 5,560,005 | A | 9/1996 | Hoover et al. | |
| 5,574,898 | A | 11/1996 | Leblang et al. | |
| 6,078,918 | A * | 6/2000 | Allen et al. | 707/6 |
| 2005/0097150 | A1 * | 5/2005 | McKeon et al. | 707/202 |
| 2006/0053171 | A1 * | 3/2006 | Eldridge et al. | 707/203 |
| 2006/0053175 | A1 * | 3/2006 | Gardner et al. | 707/203 |
| 2006/0238919 | A1 * | 10/2006 | Bradley | 360/128 |
| 2006/0248045 | A1 * | 11/2006 | Toledano et al. | 707/2 |
| 2006/0288268 | A1 * | 12/2006 | Srinivasan et al. | 715/505 |
| 2007/0143317 | A1 * | 6/2007 | Hogue et al. | 707/100 |

* cited by examiner

*Primary Examiner*—Donald Sparks
*Assistant Examiner*—Vincent M Gonzales
(74) *Attorney, Agent, or Firm*—Morgan, Lewis & Bockius LLP

(57) ABSTRACT

Metadata is used to determine rules that can be applied to facts. In one embodiment, correlations are identified among types of objects and the attributes of the facts associated with those objects. In another embodiment, correlations are identified among types of objects, the attributes of the facts associated with the objects, and the format and/or range of the values of the facts having those attributes. When a correlation exists between objects of a given type and the attributes of the facts associated with objects of that type, a rule is created for objects of that type. The rule is applied to objects of the given type.

42 Claims, 12 Drawing Sheets

| Object ID=1 | Fact ID=10 |
| Object ID=1 | Fact ID=20 |
| Object ID=1 | Fact ID=30 |
| Object ID=2 | Fact ID=40 |

| Object Type | Number of Occurrences | | | | | |
|---|---|---|---|---|---|---|
| Country | 1 | 0 | 139 | 2 | 219 | 53 |
| Animal | 61 | 197 | 0 | 112 | 27 | 146 |
| Person | 394 | 41 | 1 | 505 | 0 | 487 |
| City | 18 | 0 | 2 | 1 | 317 | 61 |
| | Mother | Habitat | Capital | Hair Color | Population | Height |
| | | | | | | Attribute |

402 Correlation Table

SYSTEM AND METHOD FOR UPDATING FACTS IN A FACT REPOSITORY

TECHNICAL FIELD

The disclosed embodiments relate generally to fact databases. More particularly, the disclosed embodiments relate to determining and applying rules based on metadata associated with facts in a database.

BACKGROUND

When data is gathered from diverse sources, there are many opportunities for errors. Untrustworthy documents can provide deliberately false information, and nonstandard organization of information can cause mistakes in importation. Some errors that would be obvious to a human are challenging to detect in an automated data collection and organization process. What is a needed is a method to use metadata to improve the quality of collected information.

SUMMARY

The above and other needs are met by a method, system, and computer program product for updating facts associated with objects stored in a repository, where each fact includes an attribute. In one embodiment, the method comprises identifying a correlation between a type of a first object stored in the repository and an attribute of a fact associated with the first object. The method further comprises determining a rule based on the correlation between the type of the first object and the attribute of the fact associated with the first object and applying the rule to a second object of the type to modify the second object to produce a groomed object. The method stores the groomed object in the repository.

In one embodiment, the system and computer program product comprise a rule creation engine for identifying a correlation between a type of a first object stored in the repository and an attribute of a fact associated with the first object and for determining a rule based on the correlation between the type of the first object and the attribute of the fact associated with the first object. The system and computer program product further comprise a rule application engine for applying the rule to a second object of the type to modify the second object to produce a groomed object, and for storing the groomed object in the repository.

BRIEF DESCRIPTION OF THE DRAWINGS

FIGS. 2(a)-2(d) are block diagrams illustrating a data structure for facts within a repository of FIG. 1 in accordance with some embodiments.

FIG. 4 illustrates various exemplary correlations between object type and attributes of facts.

DESCRIPTION OF EMBODIMENTS

Embodiments are now described with reference to the figures where like reference numbers indicate identical or functionally similar elements.

Figure 1:
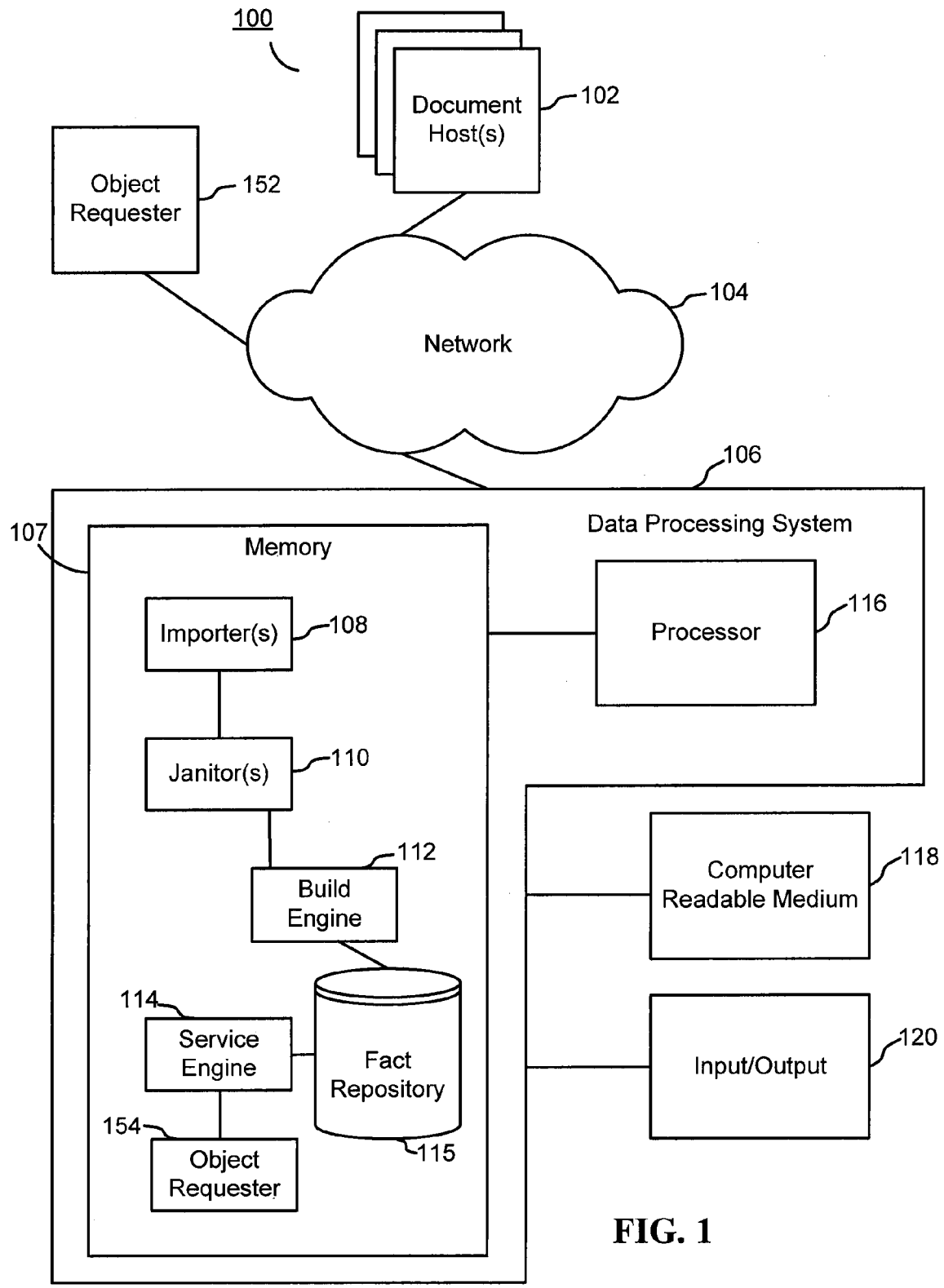
FIG. 1 shows a system architecture adapted to support one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981."Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(a)-2(d).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, importer the 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
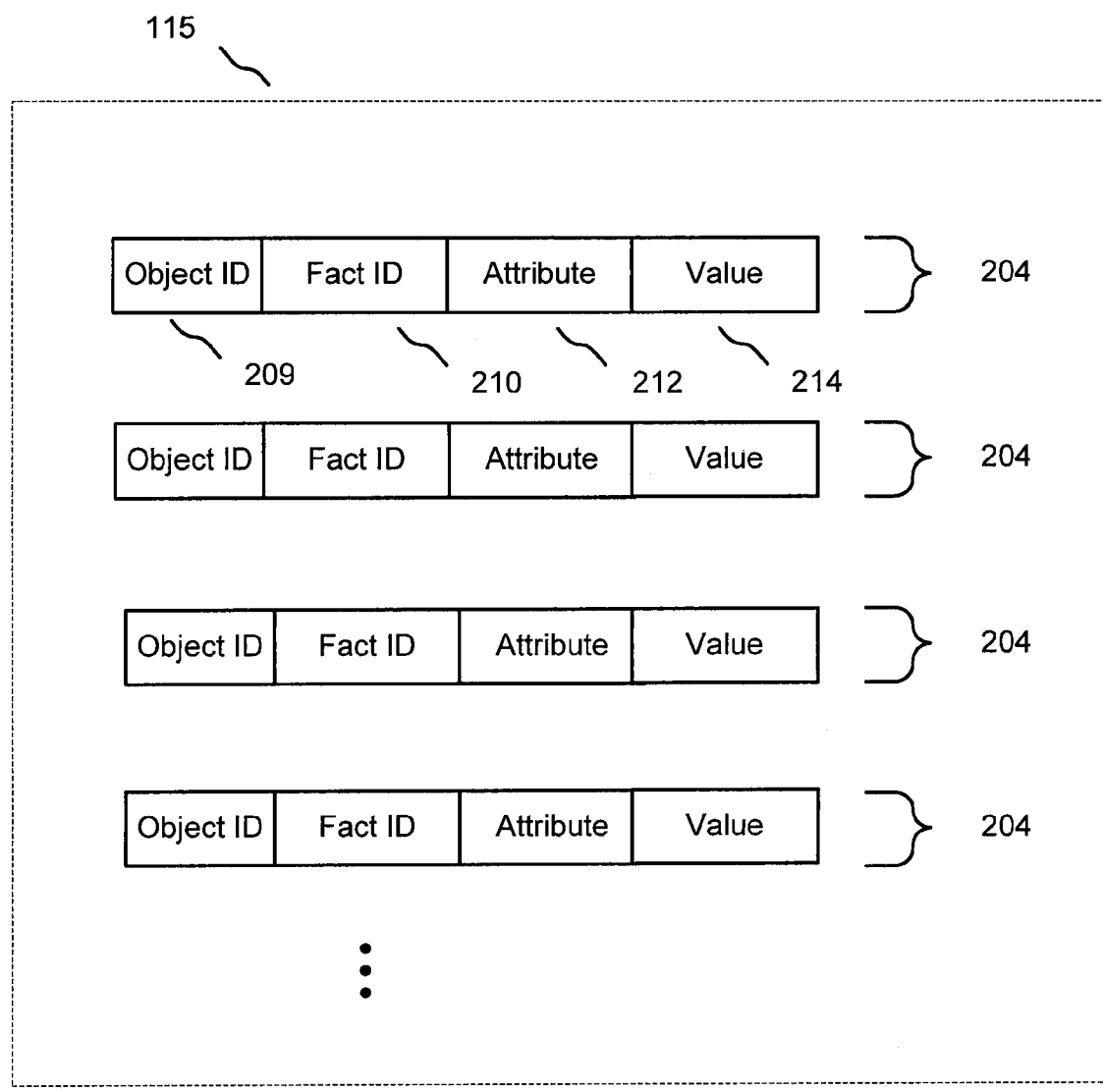

FIG. 2(a) shows an example format of a data structure for facts within the repository 115, according to some embodiments. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
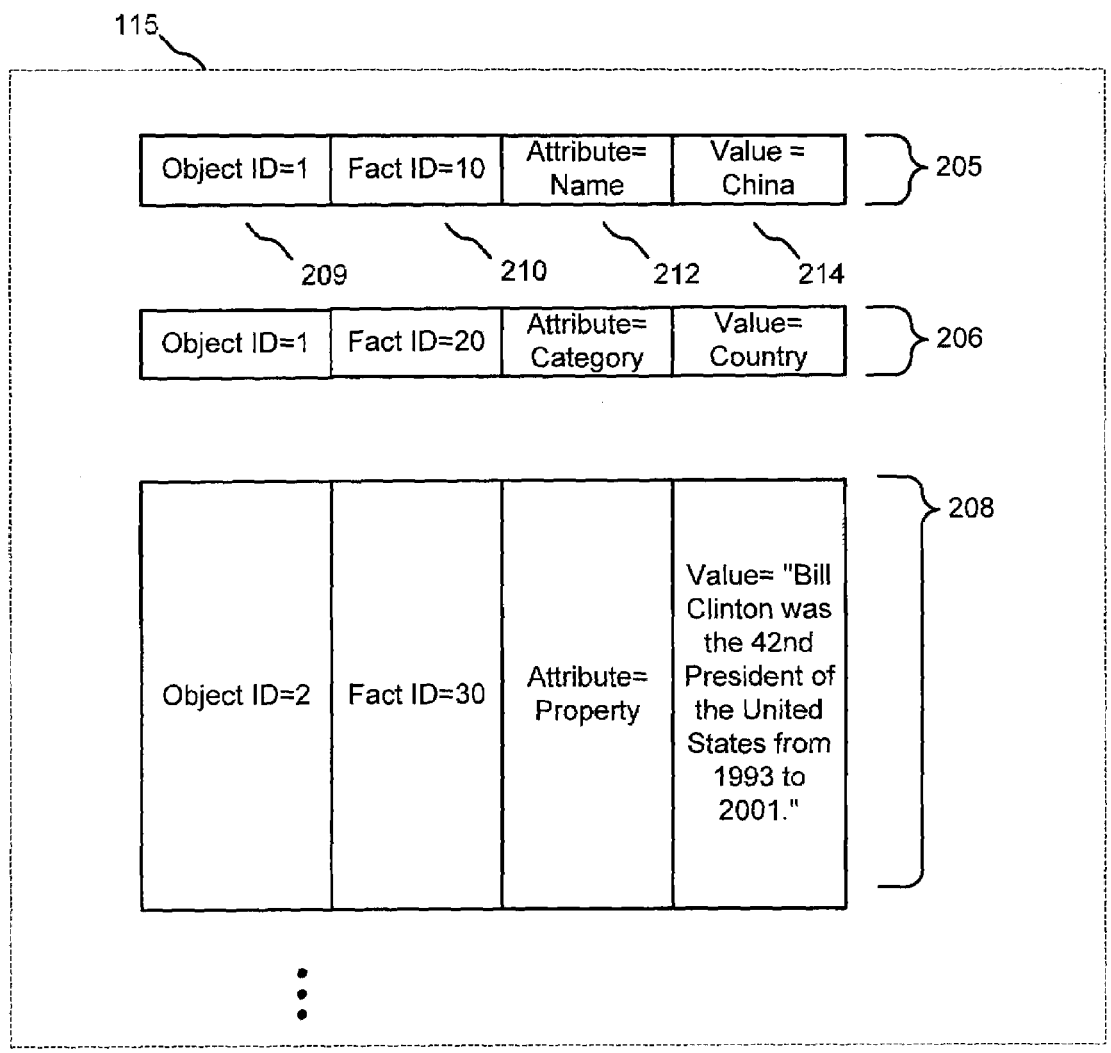
Figure 2D:
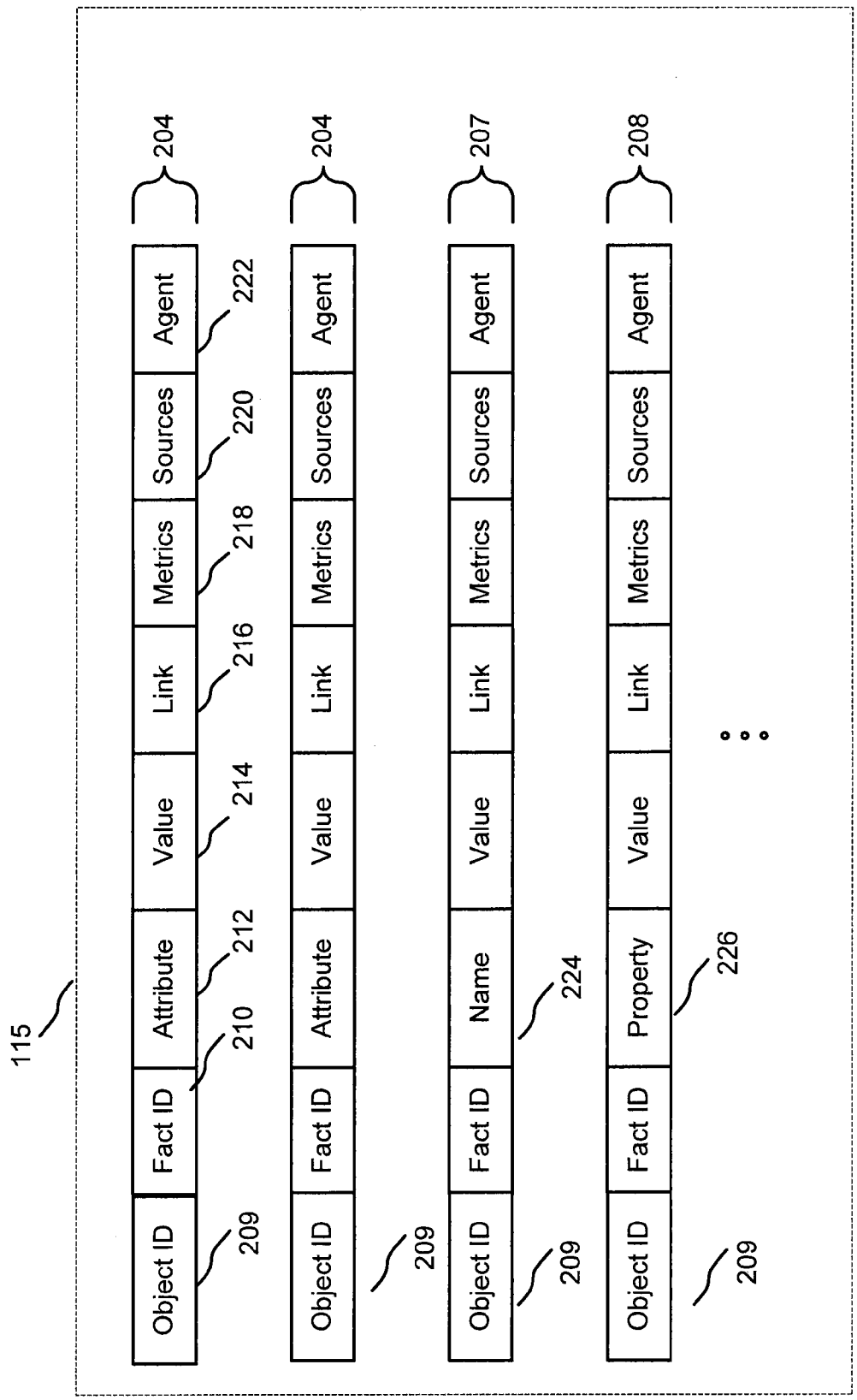

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(*a*)-2(*d*) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s)

and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
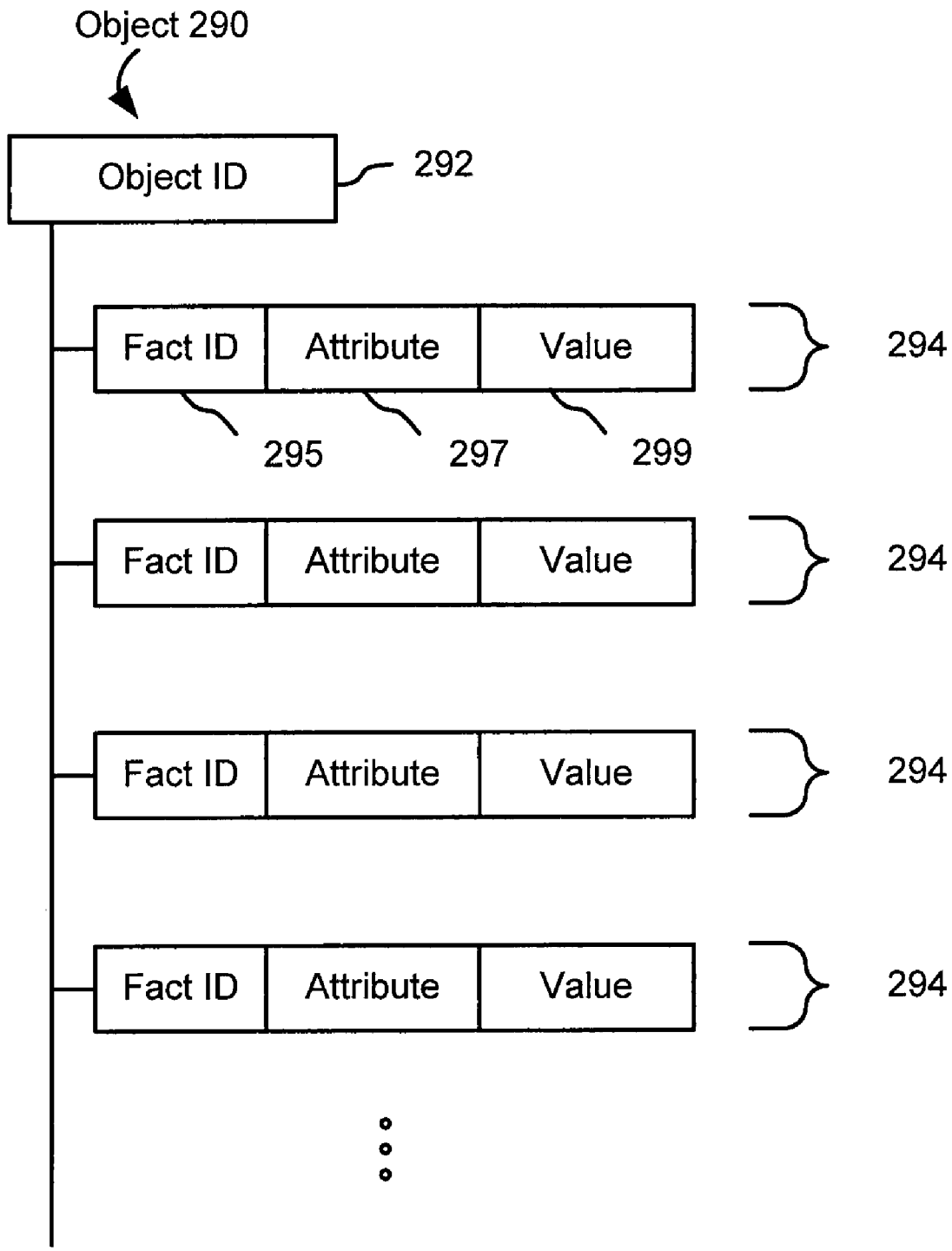
FIG. 2(e) is a block diagram illustrating an alternate data structure for facts and objects in accordance with some embodiments.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognized that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Figure 3:
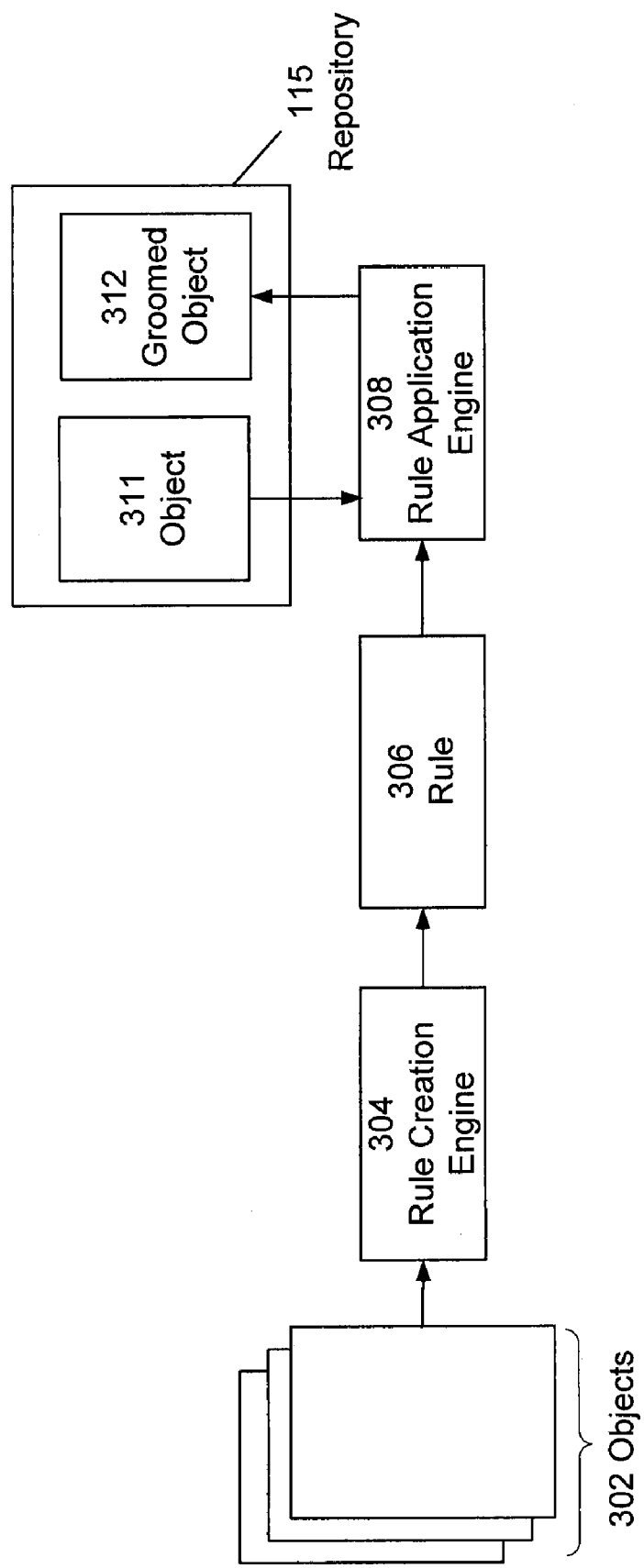
FIG. 3 illustrates a system for creating and applying rules based on metadata associated with an object, according to one embodiment.

FIG. 3 illustrates a system for creating and applying rules based on metadata associated with an object, according to one embodiment. In one embodiment, various components of the system illustrated in FIG. 3 are implemented in a janitor 110, such as a metadata janitor. A method used by the metadata janitor, according to one embodiment of the present invention, is described herein with reference to FIG. 7.

A rule creation engine 304 is configured to receive a plurality of objects 302. In one embodiment, the objects 302 are stored in the repository 115. The rule creation engine 304 is configured to identify correlations among types of objects and attributes of facts associated with those objects. In one embodiment, the rule creation engine 304 is configured to identify correlations among types of objects, the attributes of the facts associated with the objects, and the format and/or range of the values of the facts having those attributes. Several exemplary correlations between object type and attributes of facts that the rule creation engine 304 can identify are described herein with reference to FIG. 4.

The rule creation engine 304 is configured to determine a rule 306 based on an identified correlation. An example of a rule 306, according to one embodiment, is described herein with reference to FIG. 5.

A rule application engine 308 is configured to apply the rule 306 to an object 311. In one embodiment, the object 311 is stored in the repository 115. The object 311 can also be included in the set of objects 302. The rule application engine 308 is configured to apply the rule 306 to the object 311 to produce a groomed object 312. The groomed object 312 is based on the object 311, and can be associated with different facts than the object 311 based on the application of the rule 306. In one embodiment, the groomed object 312 is stored in the repository 115. In a further embodiment, the rule application engine 308 is configured to overwrite the object 311 with the groomed object 312 in the repository 115. In another embodiment, the groomed object 312 and the object 311 are associated with a common object ID.

For the purposes of illustration, the rule creation engine 304 and the rule application engine 308 are shown as separate components. In one embodiment, both the rule creation engine 304 and the rule application engine 308 are implemented in a metadata janitor. Such a janitor is configured to process a set of objects 302, identify correlations in the objects 302, and create and apply rules based on those correlations resulting in the modification of at least some of the objects 302. Advantageously, a metadata janitor can improve the quality of facts in the repository 115 and, through cooperation with an importer, assist with the successful importation of new facts.

FIG. 4 illustrates various exemplary correlations between object type and attributes of facts. In one embodiment, identifying a correlation comprises constructing a correlation table 402. The rule creation engine 304 identifies correlations between object type and attributes of facts using the correlation table 402. The correlation table 402 shown in FIG. 4 has been given for the purposes of illustration and is not limiting. In one embodiment, an object type can be implemented as any metadata describing, for example, the kind, type, or category of a set of facts. In various embodiments, the rule creation engine 304 can use a variety of techniques and structures to identify correlations between object type and attributes of facts.

A first dimension is indexed by various object types. In the example illustrated, object types include "Country", "Animal", "Person", and "City". These examples of object types have been given for the purposes of illustration and are not limiting. Other examples of object types will be apparent to one of skill in the art.

A second dimension is indexed by various attributes. In the example illustrated, attributes include "Mother", "Habitat", "Capital", "Hair Color", "Population" and "Height". These examples of attributes have been given for the purposes of illustration and are not limiting. Other examples of attributes will be apparent to one of skill in the art. In one embodiment, the correlation table 402 includes all attributes that exist as a component of a fact in the repository 115. In another embodiment, the set of attributes included in the correlation table 402 is a subset of the set of all attributes that exist as a component of a fact in the repository 115. For example, only attributes that occur a number of times above some minimal threshold will be included in the correlation table 402.

Entries in the correlation table 402 indicate the number of objects associated with facts having various attributes. A particular entry in the correlation table 402 indicates the number of objects of a first type in the repository 115 that are associated with facts having a first attribute. For example, the entry for the "Country"/"Mother" pair indicates the number of objects of the type "Country" in the repository 115 associated with one or more facts having the attribute "Mother".

Entries in the correlation table 402 can be given in a variety of metrics. For example, the number of objects associated with one or more facts having a particular attribute can be given as an absolute or relative count, a percentage, or as an aggregated or rounded figure. In the example illustrated, entries in the correlation table 402 are rounded to the thousands.

The correlation table 402 is used to identify correlations between object type and fact attributes. For example, in the example illustrated there is a positive correlation between objects of the type "Country" and facts having the attribute "Capital". Objects of a given type are said to be correlated with facts having a given attribute when objects of the given type are more likely to be associated with a fact having the given attribute than with another fact. Therefore, the rule creation engine 304 can create a rule indicating that objects of the type "Country" should have a "Capital" fact. As another example, there is a negative correlation between objects of the type "Country" and facts having the attribute "Hair Color". Objects of a given type are said to be negatively correlated with facts having a given attribute when objects of the given type are less likely to be associated with a fact having the given attribute than with another fact. Therefore, the rule creation engine 304 can create a rule indicating that objects of the type "Country" should not have any "Hair Color" facts.

Other entries in the correlation table 402 may be more ambiguous. For example, a moderate number of "Country" and "City" objects have "Height" facts. In the example illustrated, there is no positive or negative correlation between these objects and these facts.

An embodiment in which correlations are identified among object types and the attributes or facts has been shown because of its relative visual simplicity. In another embodiment, correlations are identified among types of objects, the attributes of the facts associated with the objects, and the format and/or range of the values of the facts having those attributes. In various embodiments, higher dimension correlation tables can be implemented to facilitate identification of correlation among higher numbers of variables. For example, a three-dimensional correlation table can be used to identify correlations between facts having a first attribute and facts having a second attribute for various types of objects.

Correlation tables have been described herein as an example of one technique for identifying correlations among object types, attribute facts, and in some cases, the format and/or range of attribute values. However, in various embodiments, other techniques for identifying correlations can be implemented. Other examples of techniques for identifying correlations among variables will be apparent to one of skill in the art. By identifying correlations in the repository 115, a rule creation engine 304 can advantageously create rules based on insights from the pool of available facts.

Figure 5:
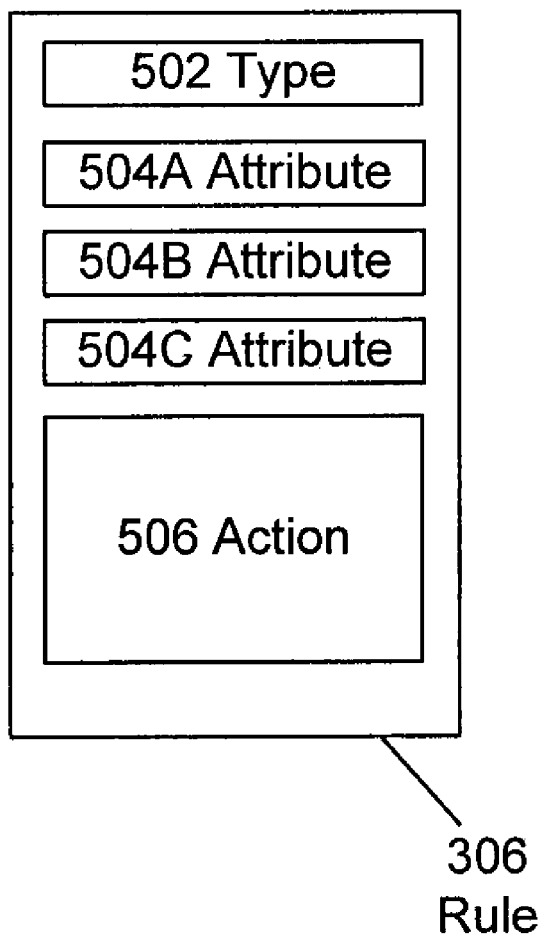
FIG. 5 illustrates a rule according to one embodiment.

FIG. 5 illustrates a rule according to one embodiment. The rule 306 includes a type 502. The type 502 describes a type of an object, such as may be contained as a value in a type fact. The type 502 indicates one or more types of objects to which the rule 306 is applicable. For example, the type 502 can indicate that the rule 306 is applicable to "Person" objects. As another example, the type 502 can indicate that the rule 306 is applicable to both "Country" and "City" objects. In one embodiment, the type 502 can indicate that the rule 306 is applicable to objects of all types.

In one embodiment, the rule 306 includes one or more attributes 504. An attribute 504 describes an attribute of a fact associated with an object. The rule 306 is applicable to objects associated with facts containing a number of the attributes 504. For example, a rule 306 can be applicable to objects of the type 502 associated with facts containing at least two of the three attributes 504. As another example, a rule 306 can be applicable to objects of the type 502 associated with facts containing any of the attributes 504. A rule 306 can include any number of attributes 504, or none at all.

The rule 306 contains an action 506. The action 506 describes restrictions and/or steps to be taken when the rule 306 is applied to an object. For example, an action 506 could specify that an object satisfying the rule should not be associated with a fact having a "Mother" attribute. As another example, an action 506 could specify that a fact having a particular attribute should have a value of a particular range and/or format. As yet another example, an action 506 could specify behavior for importers, janitors, and so on when handling an object satisfying the rule. The action 506 is typically created based on an identified correlation, and can be modified by a user. Various examples of actions 506 are described herein with reference to FIGS. 6(a) and 6(b).

Figure 6A:
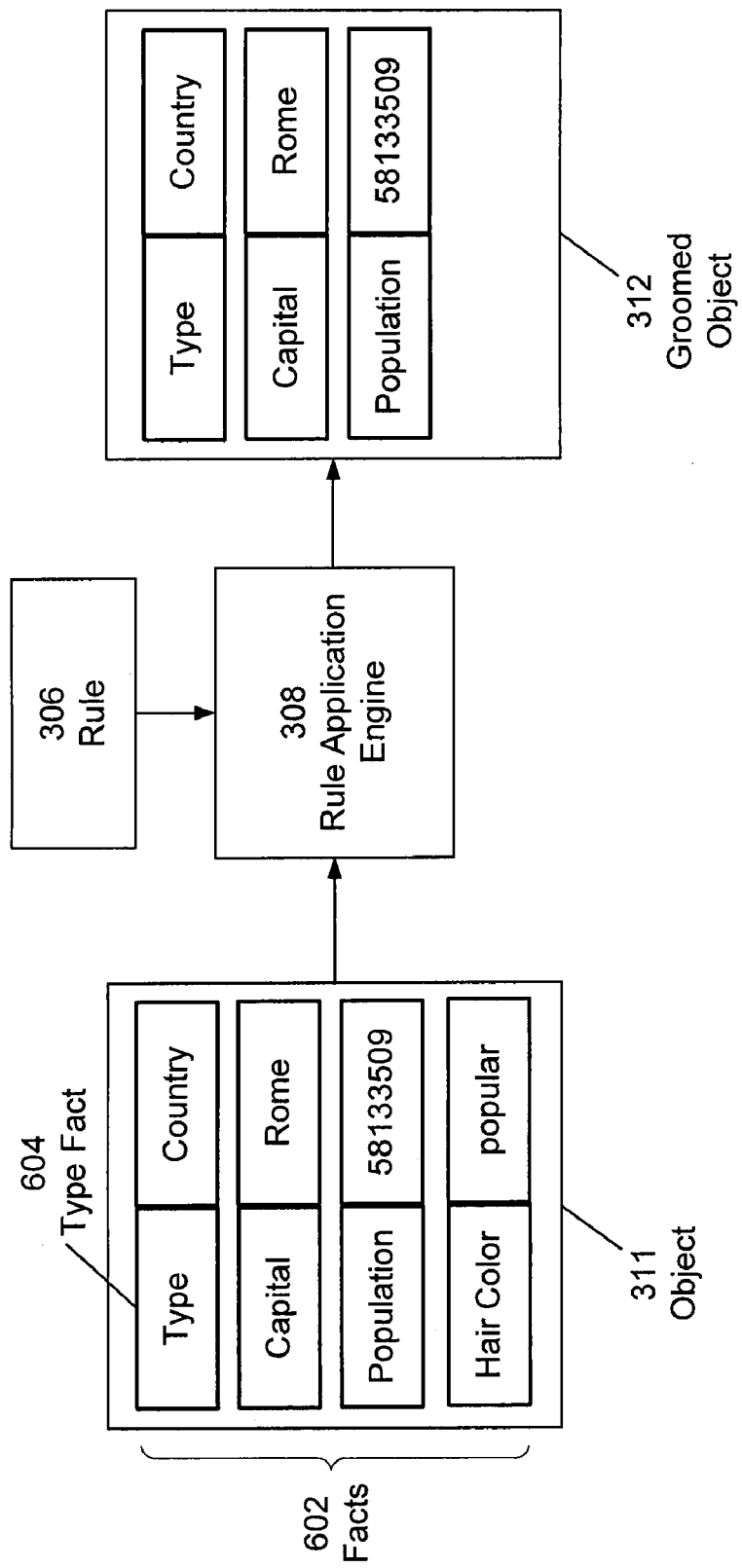
FIG. 6(a) illustrates application of a rule, according to one embodiment.

FIG. 6(a) illustrates application of a rule, according to one embodiment of the present invention. The object 311 contains a plurality of facts 602. One such fact 602 is a type fact 604. The type fact 604 indicates that the object 311 is a "Country" object. The other facts 602 include attribute/value pairs describing various aspects of the object 311.

The rule application engine 308 receives the object 311 and applies the rule 306. In the example illustrated, the rule 306 indicates that objects of the type "Country" associated with facts having a "Capital" attribute should not be associated with facts having a "Hair Color" attribute. The rule application engine 308 applies the rule 306 to produce the groomed object 312. As shown in the figure, the fact with the attribute "Hair Color" is not associated with the groomed object 312. As another example, the rule 306 can indicate that objects of the type "Country" should not be associated with facts having a "Hair Color" attribute, regardless of other facts with which the objects may be associated. Restricting the attributes of facts associated with objects of a particular type is often useful for correcting frequently made errors in a data importation process.

In one embodiment, the fact with the attribute "Hair Color" is removed from the object 311. The fact with the attribute "Hair Color" can be associated with another object, or it can be deleted from the repository 115. In one embodiment, the rule application engine 308 removes the object from the repository 115.

The fact with the attribute "Hair Color" is removed because facts with the attribute "Hair Color" have a negative correlation with "Country" objects in the repository 115. In the example illustrated, the "Hair Color" fact appears to have been created by an error in the importer or in the source document. Advantageously, the rule creation and rule application engines apply insights from the larger repository 115 to correct facts with attributes that are inappropriate for objects of a given type.

Figure 6B:
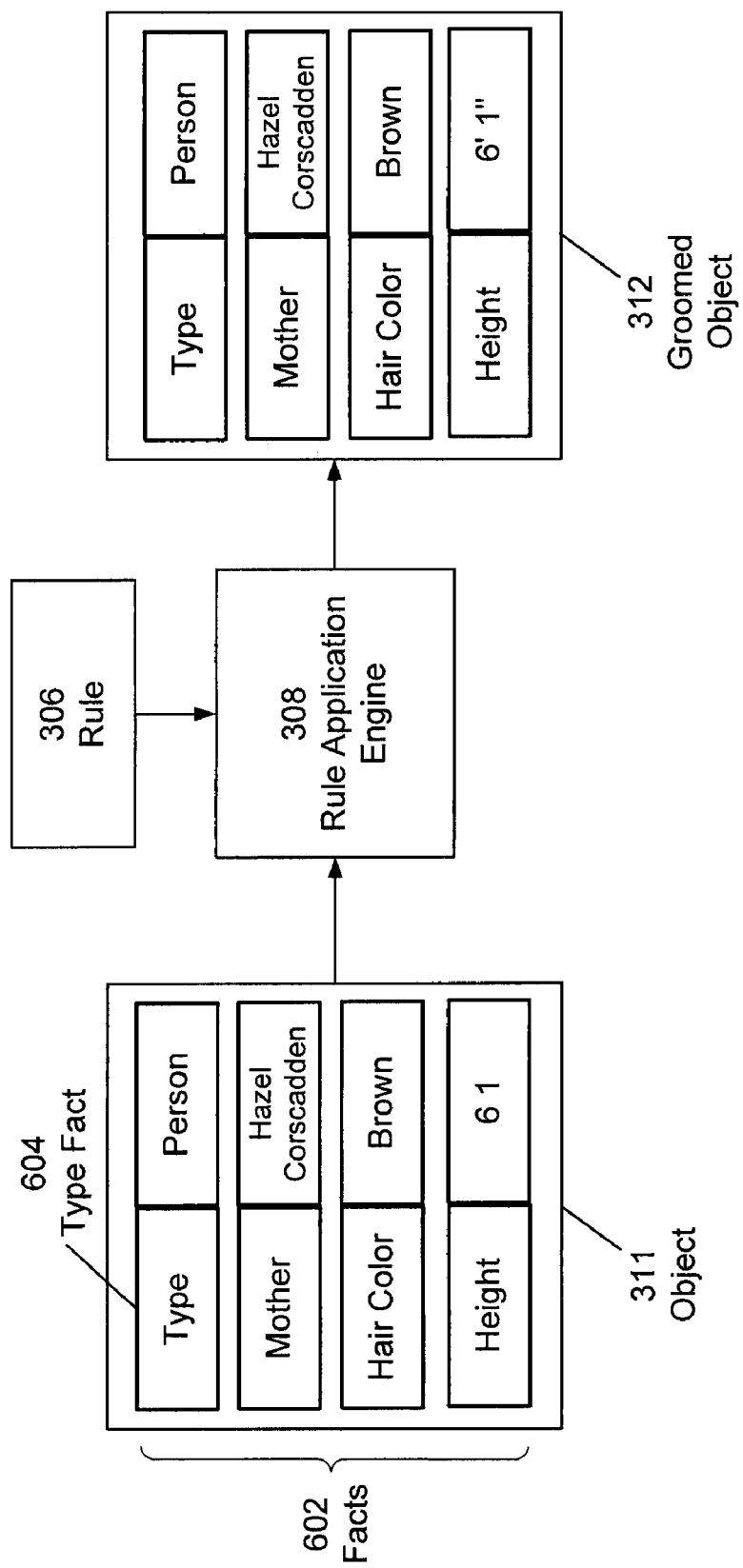
FIG. 6(b) illustrates application of a rule, according to another embodiment.

FIG. 6(b) illustrates application of a rule, according to another embodiment of the present invention. The object 311 contains a plurality of facts 602. One such fact 602 is a type fact 604. The type fact 604 indicates that the object 311 is a "Person" object. Another fact has the attribute "Height" and the improperly formatted value "6 1". The other facts 602 include attribute/value pairs describing various aspects of the object 311.

The rule application engine 308 receives the object 311 and applies the rule 306. In the example illustrated, the rule 306 indicates that facts having a "Height" attribute associated with objects of the type "Person" should be of a specified format. The rule application engine 308 applies the rule 306 to produce the groomed object 312. As shown in the figure, the value of the fact with the attribute "Height" is formatted properly in the groomed object 312.

The value of the fact with the attribute "Height" is formatted to reflect the expected range/format of objects of the type "Person". As another example, a "Height" fact with value of "17 feet three inches" could be disassociated or deleted because the value is outside the expected range of "Height" for objects of the type "Person". As another example, the rule 506 could specify that facts associated with all types of objects having a "Height" attribute should have a numeric value. Facts having the attribute "Height" with non-numeric values are deleted or reformatted when the rule is applied. Advantageously, the rule creation and rule application engines apply insights from the repository 115 to correct errors in the values of particular facts.

Figure 7:
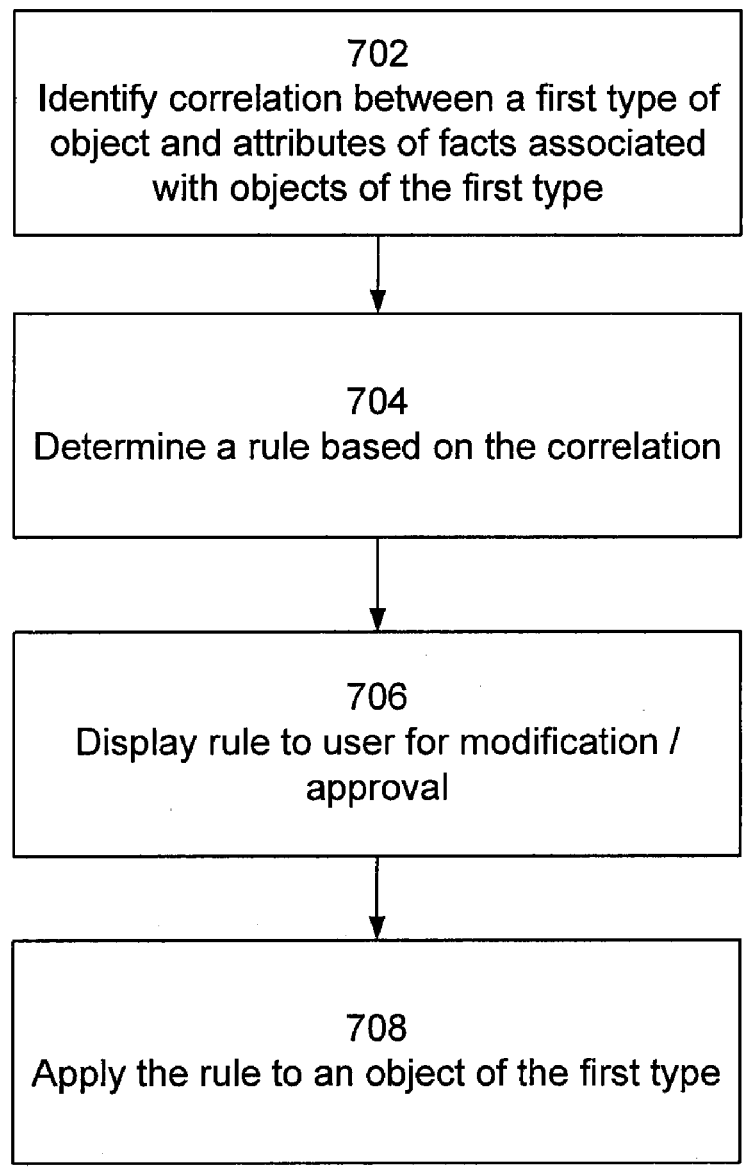
FIG. 7 illustrates a method for creating and applying rules based on metadata associated with an object, according to one embodiment.

FIG. 7 illustrates a method for creating and applying rules based on metadata associated with an object, according to one embodiment. In one embodiment, the method is performed by a metadata janitor.

The metadata janitor identifies 702 a correlation between at least a first type of object and attributes of facts. For example, in the example illustrated in FIG. 4, the metadata janitor may identify 702 a negative correlation between "Person" objects and facts having the attribute "Capital", because "Person" objects are comparatively unlikely to be associated with at least one fact having the attribute "Capital".

In one embodiment, the metadata janitor can identify 702 a correlation between a first type of object, an attribute of facts, and a range and/or format of the values of facts having the attribute. For example, the metadata may identify 702 a positive correlation between "Person" objects, facts having the attribute "Height", and a range for those facts between three feet and nine feet.

The metadata janitor determines 704 a rule based on the correlation. The metadata janitor determines 704 a rule that supports likely positive correlations and/or discourages likely negative correlations. For example, the metadata janitor can determine 704 a rule indicating that "Person" objects associated with a fact having a "Mother" attribute should not be associated with any facts having the attribute "Capital" based on the positive correlation between "Person" objects associated with facts having a "Mother" attribute and relative unlikelihood that those objects are associated with facts having a "Capital" attribute.

In one embodiment, the metadata janitor displays 706 the rule to a human user for modification and/or approval. It is often advantageous to allow a user to adjust or otherwise modify rules before applying them to objects. For example, in the example illustrated in FIG. 4, objects of the type "Country" may appear to be negatively correlated with facts having the attribute "Height", and the metadata janitor may determine 704 a rule based on the negative correlation. In many cases, however, it is beneficial to present the determined 704 rule to a human user. For example, the human user may consider that "Height" in the context of a country may refer to the average elevation above sea-level in a country, and decide that facts with the attribute "Height" should be allowed to be associated with "Country" objects (for example, when the value of the "Height" fact is within a specified range). The user can modify the rule accordingly. As another example, the human user may consider the determined 704 rule to be insufficiently stringent, and may broaden the effects of the rule as the user sees fit, advantageously improving the consistency of facts in the repository 115.

The metadata janitor applies 708 the rule to objects in the repository 115. For example, the metadata janitor can retrieve the objects in the repository 115 of the type (or types) subject to the rule and modify the objects as specified in the rule. As another example, the metadata janitor can collect a set of rules and apply them to objects iteratively. Applying 708 the rule to an object advantageously improves the accuracy and consistency of the objects in the repository 115, facilitating the organization of useful information and the importation of additional information from source documents.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for updating facts associated with objects stored in a fact repository, each fact comprising an attribute, the method comprising:
   at a server system including one or more processors and memory storing one or more programs, the one or more processors executing the one or more programs to perform the operations of:
      identifying a correlation between a type of a first object stored in the fact repository and an attribute of a fact associated with the first object based on stored correlation information, wherein the fact associated with the first object has been extracted from a web document, and wherein a respective type of a respective object categorizes an entity represented by the respective object;
      determining a rule based on the correlation between the type of the first object and the attribute of the fact associated with the first object; and
      applying the rule to a second object of the type to modify the second object to produce a groomed object; and
      storing the groomed object in the fact repository.

2. The method of claim 1, wherein the correlation is a negative correlation and the rule indicates that facts having a specific attribute should not be associated with objects of a specific type.

3. The method of claim 2, wherein applying the rule to the second object comprises disassociating a fact from the second object.

4. The method of claim 1, wherein the correlation is a positive correlation and the rule indicates that objects of a specific type should be associated with at least one fact having a specific attribute.

5. The method of claim 4, wherein applying the rule to the second object comprises associating a fact with the second object.

6. The method of claim 4, wherein applying the rule to the second object comprises modifying an attribute of a fact associated with the second object.

7. The method of claim 1, wherein each fact further comprises a value, and further comprising:
   identifying a correlation among the type of the first object, the attribute of the fact associated with the first object, and a format of the value of the fact associated with the first object.

8. The method of claim 7, wherein the rule indicates that facts having a specific attribute and associated with an object of a specific type should have a value of a specific format.

9. The method of claim 7, wherein applying the rule to the second object comprises modifying a format of a value of a fact associated with the second object.

10. The method of claim 1, wherein each fact further comprises a value, and further comprising:
    identifying a correlation among the type of the first object, the attribute of the fact associated with the first object, and a range of the value of the fact associated with the first object.

11. The method of claim 10, wherein the rule indicates that facts having a specific attribute and associated with an object of a specific type should have a value within a specific range.

12. The method of claim 1, wherein the facts associated with objects stored in the fact repository are extracted from a plurality of documents hosted by document hosts.

13. A system for updating facts associated with objects stored in a fact repository, each fact comprising an attribute, comprising:
    one or more processors;
    memory; and
    one or more programs stored in the memory, the one or more programs comprising instructions to:
       identify a correlation between a type of a first object stored in the fact repository and an attribute of a fact associated with the first object based on stored correlation information, wherein the fact associated with the first object has been extracted from a web document, and wherein a respective type of a respective object categorizes an entity represented by the respective object;
       determine a rule based on the correlation between the type of the first object and the attribute of the fact associated with the first object;
       apply the rule to a second object of the type to modify the second object to produce a groomed object; and
       store the groomed object in the fact repository.

14. The system of claim 13, wherein the correlation is a negative correlation and the rule indicates that facts having a specific attribute should not be associated with objects of a specific type.

15. The system of claim 14, wherein the instructions to apply the rule to the second object comprises instructions to disassociate a fact from the second object.

16. The system of claim 13, wherein the correlation is a positive correlation and the rule indicates that objects of a specific type should be associated with at least one fact having a specific attribute.

17. The system of claim 16, wherein the instructions to apply the rule to the second object comprises instructions to associate a fact with the second object.

18. The system of claim 16, wherein the instructions to apply the rule to the second object comprises instructions to modify an attribute of a fact associated with the second object.

19. The system of claim 13, wherein each fact further comprises a value, and wherein the rule creation engine is further adapted to:
identify a correlation among the type of the first object, the attribute of the fact associated with the first object, and a format of the value of the fact associated with the first object.

20. The system of claim 19, wherein the rule indicates that facts having a specific attribute and associated with an object of a specific type should have a value of a specific format.

21. The system of claim 19, wherein the instructions to apply the rule to the second object comprises instructions to modify a format of a value of a fact associated with the second object.

22. The system of claim 13, wherein each fact further comprises a value, and wherein the rule creation engine is further adapted to:
identify a correlation among the type of the first object, the attribute of the fact associated with the first object, and a range of the value of the fact associated with the first object.

23. The system of claim 22, wherein the rule indicates that facts having a specific attribute and associated with an object of a specific type should have a value within a specific range.

24. The system of claim 13, wherein the facts associated with objects stored in the fact repository are extracted from a plurality of documents hosted by document hosts.

25. A computer readable storage medium storing one or more programs configured for execution by a server system having one or more processor and memory, the memory including one or more programs comprising instructions to:
identify a correlation between a type of a first object stored in a fact repository and an attribute of a fact associated with the first object based on stored correlation information, wherein the fact associated with the first object has been extracted from a web document, and wherein a respective type of a respective object categorizes an entity represented by the respective object;
determine a rule based on the correlation between the type of the first object and the attribute of the fact associated with the first object;
apply the rule to a second object of the type to modify the second object to produce a groomed object; and
store the groomed object in the fact repository.

26. The computer readable storage medium of claim 25, wherein the correlation is a negative correlation and the rule indicates that facts having a specific attribute should not be associated with objects of a specific type.

27. The computer readable storage medium of claim 26, wherein the instructions to apply the rule to the second object comprises instructions to disassociate a fact from the second object.

28. The computer readable storage medium of claim 25, wherein the correlation is a positive correlation and the rule indicates that objects of a specific type should be associated with at least one fact having a specific attribute.

29. The computer readable storage medium of claim 28, wherein the instructions to apply the rule to the second object comprises instructions to associate a fact with the second object.

30. The computer readable storage medium of claim 28, wherein the instructions to apply the rule to the second object comprises instructions to modify an attribute of a fact associated with the second object.

31. The computer readable storage medium of claim 25, wherein each fact further comprises a value, and wherein the rule creation engine is further adapted to:
identify a correlation among the type of the first object, the attribute of the fact associated with the first object, and a format of the value of the fact associated with the first object.

32. The computer readable storage medium of claim 31, wherein the rule indicates that facts having a specific attribute and associated with an object of a specific type should have a value of a specific format.

33. The computer readable storage medium of claim 31, wherein the instructions to apply the rule to the second object comprises instructions to modify a format of a value of a fact associated with the second object.

34. The computer readable storage medium of claim 25, wherein each fact further comprises a value, and wherein the rule creation engine is further adapted to:
identify a correlation among the type of the first object, the attribute of the fact associated with the first object, and a range of the value of the fact associated with the first object.

35. The computer readable storage medium of claim 34, wherein the rule indicates that facts having a specific attribute and associated with an object of a specific type should have a value within a specific range.

36. The computer readable storage medium of claim 25, wherein the facts associated with objects stored in the fact repository are extracted from a plurality of documents hosted by document hosts.

37. The method of claim 1, wherein the stored correlation information is a correlation table.

38. The method of claim 37, further comprising constructing the correlation table by:
identifying object types and attributes associated with objects in the fact repository; and
for each object type and attribute combination,
determining the number of objects including the object type and attribute combination; and
storing the number of objects including the object type and attribute combination in the correlation table.

39. The system of claim 13, wherein the stored correlation information is a correlation table.

40. The system of claim 39, further comprising instructions to construct the correlation table by:
identifying object types and attributes associated with objects in the fact repository; and
for each object type and attribute combination,
determining the number of objects including the object type and attribute combination; and
storing the number of objects including the object type and attribute combination in the correlation table.

41. The computer readable storage medium of claim 25, wherein the stored correlation information is a correlation table.

42. The computer readable storage medium of claim 41, further comprising instructions to construct the correlation table by:
identifying object types and attributes associated with objects in the fact repository; and
for each object type and attribute combination,
determining the number of objects including the object type and attribute combination; and
storing the number of objects including the object type and attribute combination in the correlation table.

* * * * *